United States Patent
Cramer et al.

(10) Patent No.: US 10,358,275 B1
(45) Date of Patent: Jul. 23, 2019

(54) PRESSURE RELIEF VALVE WITH A PLURAL-PART DRY STRAP

(71) Applicant: Plitek, L.L.C., Des Plaines, IL (US)

(72) Inventors: Ivan Cramer, Skokie, IL (US); Monserrat Rodriguez, Elk Grove, IL (US); Robert C. Larsen, Bartlett, IL (US)

(73) Assignee: Plitek, L.L.C., Des Plaines, IL (US)

( * ) Notice: Subject to any disclaimer, the term of this patent is extended or adjusted under 35 U.S.C. 154(b) by 0 days.

(21) Appl. No.: 15/625,299

(22) Filed: Jun. 16, 2017

(51) Int. Cl.
| F16K 7/17 | (2006.01) |
| B65D 77/22 | (2006.01) |
| F16K 15/14 | (2006.01) |
| F16K 17/18 | (2006.01) |

(52) U.S. Cl.
CPC .............. B65D 77/225 (2013.01); F16K 7/17 (2013.01); F16K 17/18 (2013.01); *F16K 15/144* (2013.01)

(58) Field of Classification Search
CPC ...... B65D 77/225; B65D 31/14; B65D 33/01; B65D 51/16; F16K 15/144; F16K 15/16; F16K 7/12; F16K 7/17; F16K 11/10; F16K 17/18; Y10T 137/7838; Y10T 137/7841; Y10T 137/7891
See application file for complete search history.

(56) References Cited

U.S. PATENT DOCUMENTS

| 2,927,722 A | 3/1960 | Metzger |
| 2,946,502 A | 7/1960 | Metzger |
| 3,595,467 A | 7/1971 | Goglio |
| 3,799,427 A | 3/1974 | Goglio |
| 4,000,846 A | 1/1977 | Gilbert |
| 4,122,993 A | 10/1978 | Glas |
| 4,134,535 A | 1/1979 | Barthels et al. |
| 4,206,870 A | 6/1980 | Devries |
| 4,420,015 A | 12/1983 | Blaser |
| 4,444,219 A | 4/1984 | Hollenstein |
| 4,576,285 A | 3/1986 | Goglio |
| 4,640,838 A | 2/1987 | Isakson et al. |
| 4,653,661 A | 3/1987 | Buchner et al. |
| 4,705,174 A | 11/1987 | Goglio |
| 4,890,637 A | 1/1990 | Lamparter |
| 4,971,218 A | 11/1990 | Buchner et al. |

(Continued)

FOREIGN PATENT DOCUMENTS

| CA | 2569303 A1 | 9/2006 |
| CA | 2829452 A1 | 4/2014 |

(Continued)

OTHER PUBLICATIONS

Robert Bosch GMBH. "CVA 2000/3000 V45 Valve Applicators for the "aromafin" V45 Exterior Aroma Protection Valves." 4 pages. Date: Undated.

(Continued)

*Primary Examiner* — Reinaldo Sanchez-Medina
*Assistant Examiner* — Hailey K. Do
(74) *Attorney, Agent, or Firm* — Jansson Munger McKinley & Kirby Ltd.

(57) ABSTRACT

One-way pressure relief valves having a plural-part dry strap are disclosed. One-way pressure relief valves may be applied to a product package to evacuate gas from the package. In embodiments, the plural-part dry strap comprises overlapping dry strap parts which impart improved operation to the valve.

23 Claims, 6 Drawing Sheets

(56) References Cited

U.S. PATENT DOCUMENTS

| | | |
|---|---|---|
| 5,263,777 A | 11/1993 | Domke |
| 5,325,765 A | 7/1994 | Sylvan et al. |
| 5,326,176 A | 7/1994 | Domke |
| 5,427,839 A | 6/1995 | Buchner et al. |
| 5,445,870 A | 8/1995 | Buchner et al. |
| 5,496,122 A | 3/1996 | Fattori |
| 5,515,994 A | 5/1996 | Goglio |
| 5,584,409 A | 12/1996 | Chemberlen |
| 5,727,881 A | 3/1998 | Domke |
| 5,782,266 A | 7/1998 | Domke |
| 5,829,884 A | 11/1998 | Yeager |
| 5,840,189 A | 11/1998 | Sylvan et al. |
| D408,679 S | 4/1999 | Potts et al. |
| 5,893,461 A | 4/1999 | Walters |
| 5,989,608 A | 11/1999 | Mizuno |
| 5,992,635 A | 11/1999 | Walters |
| 6,070,728 A | 6/2000 | Overby et al. |
| 6,079,315 A | 6/2000 | Beaulieu et al. |
| 6,082,247 A | 7/2000 | Beaulicu |
| 6,142,063 A | 11/2000 | Beaulieu et al. |
| 6,182,554 B1 | 2/2001 | Beaulieu et al. |
| 6,214,392 B1 | 4/2001 | Ramirez |
| 6,254,908 B1 | 7/2001 | Winters |
| D452,433 S | 12/2001 | Lazaris |
| D452,434 S | 12/2001 | Sweeney |
| 6,436,457 B1 | 8/2002 | Poss |
| 6,440,256 B1 | 8/2002 | Gordon et al. |
| D462,865 S | 9/2002 | Honan et al. |
| 6,468,332 B2 | 10/2002 | Goglio et al. |
| 6,516,482 B2 | 2/2003 | Karafa et al. |
| D474,110 S | 5/2003 | Sweeney |
| D474,111 S | 5/2003 | Lazaris |
| 6,589,577 B2 | 7/2003 | Lazaris et al. |
| 6,606,938 B2 | 8/2003 | Taylor |
| 6,607,762 B2 | 8/2003 | Lazaris et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,662,827 B1 | 12/2003 | Clougherty et al. |
| 6,663,284 B2 | 12/2003 | Buckingham et al. |
| 6,666,130 B2 | 12/2003 | Taylor et al. |
| 6,672,200 B2 | 1/2004 | Duffy et al. |
| 6,708,600 B2 | 3/2004 | Winkler et al. |
| D489,215 S | 5/2004 | Honan et al. |
| D502,362 S | 3/2005 | Lazaris et al. |
| D513,572 S | 1/2006 | Schaffeld et al. |
| 7,074,443 B2 | 7/2006 | Thomas et al. |
| 7,165,488 B2 | 1/2007 | Bragg et al. |
| 7,178,550 B2 | 2/2007 | Stotkiewitz et al. |
| 7,178,555 B2 | 2/2007 | Engel et al. |
| D544,299 S | 6/2007 | Schaffeld et al. |
| 7,243,683 B2 | 7/2007 | Stotkiewitz et al. |
| 7,244,223 B2 | 7/2007 | Hartman et al. |
| 7,328,543 B2 | 2/2008 | Hoffman et al. |
| 7,347,138 B2 | 3/2008 | Bragg et al. |
| 7,360,418 B2 | 4/2008 | Pelovitz |
| 7,377,162 B2 | 5/2008 | Lazaris |
| 7,398,726 B2 | 7/2008 | Streeter et al. |
| 7,399,263 B2 | 7/2008 | Hartman et al. |
| 7,472,524 B2 | 1/2009 | Hoffman et al. |
| 7,490,623 B2 | 2/2009 | Rypstra |
| 7,513,192 B2 | 4/2009 | Sullivan et al. |
| 7,523,695 B2 | 4/2009 | Streeter et al. |
| 7,611,557 B2 | 11/2009 | Hoffman |
| 7,637,283 B2 | 12/2009 | Hoffman |
| 7,640,845 B2 | 1/2010 | Woodnorth et al. |
| 7,922,026 B2 | 4/2011 | Westphal |
| D637,484 S | 5/2011 | Winkler |
| 7,967,509 B2 | 6/2011 | Turvey et al. |
| D647,398 S | 10/2011 | Winkler |
| D647,399 S | 10/2011 | Winkler |
| 8,038,023 B2 | 10/2011 | Moore et al. |
| 8,082,644 B2 | 12/2011 | Hoffman et al. |
| 8,112,971 B2 | 2/2012 | Newrones et al. |
| 8,151,694 B2 | 4/2012 | Jacobs et al. |
| 8,177,700 B2 | 5/2012 | Newrones et al. |
| 8,636,034 B2 | 1/2014 | Hoffman et al. |
| 8,746,281 B2 | 6/2014 | Morin |
| 8,783,292 B2 | 7/2014 | Hoffman et al. |
| 9,187,229 B2 | 11/2015 | Hoffman et al. |
| 2004/0035783 A1 | 2/2004 | Strohm et al. |
| 2004/0050437 A1 | 3/2004 | Engel et al. |
| 2004/0079419 A1 | 4/2004 | Taylor et al. |
| 2006/0076058 A1* | 4/2006 | Rypstra ............... B65D 77/225 137/246 |
| 2007/0090109 A1* | 4/2007 | Gustavsson .......... B65D 77/225 220/203.27 |
| 2008/0041663 A1 | 2/2008 | Hoffman et al. |
| 2009/0145841 A1 | 6/2009 | Arai |
| 2009/0169693 A1 | 7/2009 | Hoffman |
| 2011/0108752 A1 | 5/2011 | Morin |
| 2011/0284536 A1 | 11/2011 | Walters |
| 2012/0243807 A1 | 9/2012 | Pascoe |
| 2012/0247346 A1 | 10/2012 | Hoffman et al. |
| 2012/0281933 A1 | 11/2012 | Beer |
| 2013/0048125 A1 | 2/2013 | Hoffman et al. |
| 2013/0048635 A1 | 2/2013 | Hoffman et al. |
| 2013/0156897 A1 | 6/2013 | Goldstein |
| 2014/0275932 A1 | 9/2014 | Zadig |
| 2014/0318653 A1 | 10/2014 | Hoffman et al. |
| 2017/0001783 A1* | 1/2017 | Binda ................... B65D 81/34 |
| 2017/0283136 A1 | 10/2017 | Branyon |

FOREIGN PATENT DOCUMENTS

| | | |
|---|---|---|
| DE | 3312887 A1 | 10/1984 |
| EP | 0024310 A1 | 7/1980 |
| EP | 174188 A2 | 3/1986 |
| EP | 1188683 A2 | 3/2002 |
| EP | 1481911 A1 | 12/2004 |
| EP | 1538107 A2 | 6/2005 |
| EP | 2719637 A1 | 4/2014 |
| JP | 2014076858 A | 5/2014 |
| WO | 8304081 A1 | 11/1983 |
| WO | 2007113097 A1 | 10/2007 |
| WO | 2009142987 A1 | 11/2009 |
| WO | 2010020453 A1 | 2/2010 |
| WO | 2011056709 A1 | 5/2011 |
| WO | 2011091924 A1 | 8/2011 |

OTHER PUBLICATIONS

Plitek Asia Limited. "Pli-Valv Product Selection Guide." 1 page. Date: Apr. 2005.

Plitek, LLC. "PV-15 One-Way Degassing Valve Product Specification." 1 page. Date: Oct. 2007.

Plitek, LLC. "PV-28 One-Way Degassing Valve Product Specification." 1 page. Date: Oct. 2007.

Plitek, LLC. "PV-41 One-Way Degassing Valve Product Specification." 1 page. Date: Oct. 2007.

Plitek, LLC. "PVA-120 Valve Applicator Product Specification." 1 page. Date: Oct. 2007.

Plitek, LLC. "Pli-Valv Package Degassing System PV-28." www.plitek.com/products/pv28.asp. 1 page. Date: Jan. 30, 2008.

Plitek, LLC. "Pli-Valv Package Degassing System PV-41." www.plitek.com/products/pv41.asp. 1 page. Date: Jan. 30, 2008.

Excerpt From Packtv Web TV Channel for Packaging. "Avery Dennison Launches Flexis Air Pre-Oiled Valve for Coffee Packs." www.packtv.co.uk/2011/11/avery-dennison-launches-flexis-air-pre-oiled--valve-for-coffee . . . 4 pages.

Bosch aroma protection valves. 16 pages. Date: Undated.

Avery Dennison. "Degassing Valve helps protect coffee freshness." 3 pages. Date: Jul. 2012.

* cited by examiner

PRESSURE RELIEF VALVE WITH A PLURAL-PART DRY STRAP

FIELD

This invention relates generally to one-way pressure relief valves that may be applied to packaging for products, such as coffee, and more particularly, to pressure relief valves with structure facilitating improved valve operation.

BACKGROUND

Roasted coffee is most flavorful when packaged immediately following the production process. It is desirable to package the coffee immediately after roasting and processing because contact between the coffee and ambient air can oxidize the coffee, causing a degradation in coffee flavor.

An obstacle to immediate packaging of the coffee is the well-known fact that roasted coffee produces large volumetric amounts of gas, including carbon dioxide gas. If the coffee is packaged in a flexible package, such as a pillow bag, the gas will cause the package to expand and to distort, potentially resulting in failure of the package or making the package appear swollen and unattractive to a consumer. The rate of gas production by the coffee can be decreased by degassing the coffee before packaging. However, degassing the coffee delays packaging and exposes the coffee to ambient air, potentially decreasing coffee flavor as described previously. And, a large building is required to accommodate the degassing equipment.

A solution to the aforementioned problems is to package the coffee immediately after roasting and processing in a package including a one-way pressure relief. A pressure relief valve provides an opportunity to release gas from the package while protecting the coffee from any contact with ambient air and the resultant oxidation. More specifically, the pressure relief valve is attached to, or is a part of, the coffee package. The pressure relief valve allows high-pressure gas out of the package while preventing ambient air from entering the package and coming into contact with the coffee.

For optimal valve operation, it is desirable for the pressure relief valve to be sensitive to increases in gas pressure within the package. Further, it is desirable for the valve to be engineered to both open and close consistently at known, predetermined pressures. Opening and closing at relatively lower pressures is desirable if the valve is to be used with a flexible package, such as a pillow bag, because the gas can be released before causing noticeable expansion and distortion of the bag.

Certain pressure relief valves utilize a component referred to in the valve industry as a "dry strap" or simply as a "strap" in combination with a fluid which wets a surface of the dry strap to control the one-way flow of gas through the valve. Such a dry strap is typically a strip-like layer or membrane which overlies a vent provided in a base or other element of the valve. The dry strap provides a closure around and over the vent which permits gas outflow while blocking ambient air inflow. The wetting fluid, such as a silicone oil, a graphite impregnated oil, or a food grade oil, is typically added between the dry strap and base or between the dry strap and other element and around the vent to wet the facing surface of the dry strap and base or other element facing the dry strap. The surface tension provided by the wetting fluid enables the dry strap to provide a complete closure of the dry strap against the base or other element of the valve, sealing the vent. The wetting fluid may be applied just before the valve is applied to the package or at the time of valve manufacture.

One-way pressure relief valves including a wetting fluid are excellent for their intended purpose. The wetting fluid provides for an excellent air-tight seal of the valve and valves including a wetting fluid can be engineered to open and close at predictable, low pressures.

However, the use of a wetting fluid introduces complexity to the valve manufacturing process. For example, inclusion of a wetting fluid requires a fluid-application step, which can add cost. If not manufactured correctly, it is possible that the wetting fluid can leak from the valve making the valve feel greasy and potentially diminishing the appearance of the valve to a consumer. If wetting fluid contacts the adhesive on the bottom of the valve prior to application, the wetting fluid can lessen the effectiveness of the adhesive.

It would be an improvement in the art to provide a one-way pressure relief valve which enables gas to be released from a package while blocking entry of ambient air or other gas back into the package, which is sensitive to gas pressure changes, which can be engineered to open and close reliably at known pressures, which, in certain embodiments, can be engineered to function with a wetting fluid and yet open and close at low pressures, which, in certain other embodiments, can be engineered to function without a wetting fluid and yet still open and close at low pressures, and which can contribute to a perceived improvement in the quality of the packaged goods.

SUMMARY

The present invention relates to improved one-way pressure relief valves with a plural-part dry strap. The valves may be used to vent gas from a package, such as but not limited to, a package containing roasted, ground coffee. Iterations of the improved pressure relief valve can be manufactured with or without a wetting fluid. Valves made with a plural-part dry strap according to the invention have certain performance improvements as described herein. Valves with a plural-part dry strap can be manufactured to open and close at predetermined, known pressures providing an opportunity to maintain packaging shape and integrity while enhancing the perceived quality of the packaged goods by avoiding contact between the packaged goods and ambient air.

In embodiments, a one-way pressure relief valve may include a base, a cover, and a plural-part dry strap between the base and the cover. In certain embodiments, a wetting fluid may be disposed between the plural-part dry strap and the base entirely around the vent to maintain an air-tight seal when the valve is closed. In other embodiments, a pair of closure layers may be substituted for the wetting fluid to provide the air-tight seal.

In embodiments, the base may have a top, a bottom, a width, a peripheral edge, and a vent extending entirely through the base. The cover may overly the base. Cover embodiments may have both a peripheral edge and opposite ends. The opposite ends may be secured with respect to the top of the base and the opposite ends of the cover may define a cover width. The peripheral edge of the cover may be adjacent the peripheral edge of the base. An adhesive may be provided to secure the cover to the top of the base. The adhesive may also secure the plural-part dry strap to the cover. The bottom of the base may have an adhesive applied to it to secure the pressure relief valve to a surface, such as a package. The valve would preferably be placed on the surface of the package with the vent in the base over, surrounding, and in alignment with a vent in the package.

In embodiments of the invention, the plural-part dry strap may have a total width less than the widths of the base and the cover. Such an arrangement would allow the cover to be secured to the base on opposite sides of the plural-part dry strap. In embodiments, the plural-part dry strap may overly the entire vent between the base and the cover.

The plural-part dry strap may have overlapping dry strap parts. The overlapped edge of one of the dry strap parts preferably both overlies the vent and extends between the cover and base to a position adjacent at least one of the peripheral edges. Gas may escape from the valve along the at least one peripheral edge of the valve. The overlapped inner edge of the plural-part dry strap may fully extend to and meet the adjacent peripheral edges of the base and the cover.

In embodiments, the plural-part dry strap comprises first and second dry strap parts. The first dry strap part may have a top, a bottom, and the overlapped edge. The second dry strap part may have a top and a bottom. A portion of the bottom of the second dry strap part may overlap the edge and top of the first dry strap part and the second dry strap part may have another portion of its bottom which is non-overlapping of the first dry strap part.

In embodiments, the first and second dry strap parts may each have a thickness dimension. If the bottom of the first dry strap defines a plane, then the non-overlapping bottom of the second dry strap part along the overlapped edge is spaced from the plane by at least the thickness dimension. The overlap can influence opening of the valve. In embodiments, less pressure may be required to allow gas flow between the base and the non-overlapping bottom of the second dry strap part along the overlapped edge than the pressure required to allow gas flow between the base and the bottom of the first dry strap part.

In certain embodiments, first and second closure layers provide an air-tight seal between the base and the plural-part dry strap when the valve is closed. One closure layer may comprise a release layer and the other of the first and second closure layers may comprises an adhesive-like material layer. The release layer and the adhesive-like material layer may be separably held together by an attraction resulting from material properties of the first and second closure layers. One of the first and second closure layers may be on the bottom of the plural part dry strap and the other of the first and second closure layers may be on the base so that the layers are in contact when the valve is closed. The first and second closure layers may be separated by an increase in pressure within the package to allow gas to be vented from the package. The first and second closure layers can re-seal once the pressure inside the package is decreased and the valve closes. As an alternative to the first and second closure layers, a wetting fluid such as silicone oil, may be used to maintain the air tight seal when the valve is closed.

Other features and embodiments are described in the drawings and detailed description which follows.

BRIEF DESCRIPTION OF THE DRAWINGS

Examples of one-way pressure relief valves having a plural-part dry strap may be understood by reference to the following description taken in conjunction with the accompanying drawings, in which like reference numerals identify like elements throughout the different views. For convenience and brevity, like reference numbers are used for like parts amongst the embodiments. The drawings are not necessarily to scale, emphasis instead being placed upon illustrating the principles of the invention.

In the accompanying drawings.

DETAILED DESCRIPTION

Figure 1:
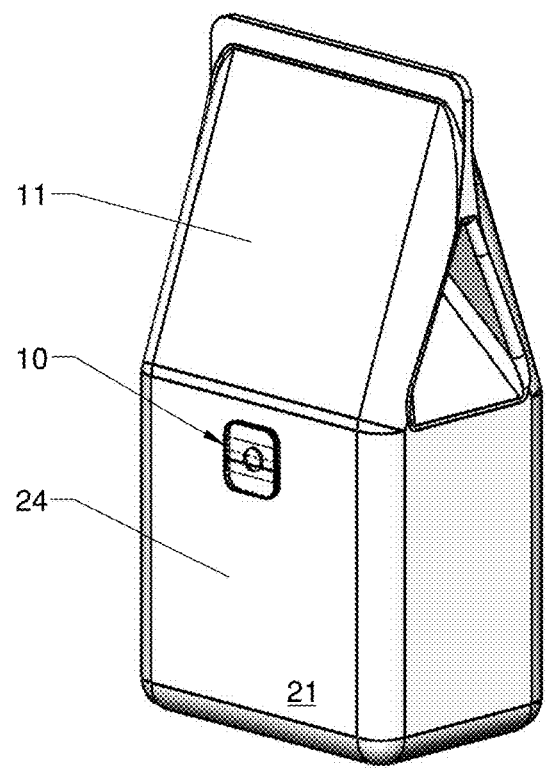
FIG. 1 is a coffee package including an embodiment of a pressure relief having a plural-part dry strap including broken lines to indicate certain internal components.

As illustrated in FIGS. 1-9, the present invention relates to an improved one-way pressure relief valve 10, 110 for releasing gas from a product package 11, one non-limiting example of which is the bag-type package 11 illustrated in FIG. 1. Certain components of valves 10, 110 may be alike and, for convenience and brevity, such components are discussed concurrently while components specific to the various embodiments are discussed in connection with each such embodiment. A feature of valve 10, 110 as described herein is that valve 10, 110 is provided with a dry strap 13 or 113 having plural parts 15, 17 or 115, 117. Such dry strap 13, 113 is referred to herein as a "plural-part dry strap."

Pressure relief valves with a unitary (i.e., singular) dry strap, quite unlike the present valves 10, 110 in terms of structure and operation, have been utilized for years. Historically, the term "dry strap" has been used as a descriptor even if the dry strap is used in conjunction with a wetting liquid, fluid, or another material provided to facilitate opening and closing of the valve. Therefore, and for purposes of this application, the term "dry" in plural-part dry strap 13, 113 is merely reflective of long-standing industry nomenclature and is not intended to serve as a limitation requiring dryness, or avoidance of contact with any liquid, fluid, or material of any other type.

The inventive plural part-dry strap 13, 113 enables valve 10, 110 to be highly sensitive to gas pressure increases within package 11 and to open reliably at a known, predetermined pressure while simultaneously blocking entry of ambient air through the valve 10, 110 and into package 11. Plural part-dry strap 13, 113 enables embodiments of a valve 10 which do not require a wetting fluid, and yet function at least as reliably as a valve including a wetting fluid. This may be desirable in certain applications where a wetting fluid is not wanted. Plural part-dry strap 13, 113 also enables embodiments of a valve 110 which may include a wetting fluid.

Package Examples

Referring then to FIG. 1, the package 11 example illustrated therein may be of a type used to hold consumable goods such as ground roasted coffee 19. Packages 11 of this type may have flexible, collapsible wall or walls 21 and are sometimes referred to as a "pillow bag." These types of packages 11 are closed or sealed once filled with coffee 19 or another material. Such packages may be re-closed once coffee 19 or other material is removed therefrom. Gas produced internal to package 11 by gas-producing material such as coffee 19 can cause the package 11 wall(s) 21 to expand and take on a swollen appearance which may be unattractive to consumers. The expanded volumetric size of a swollen package 11 may make it problematic to hold multiple packages 11 in a single box, or to store packages 11 on a grocery store or household shelf.

Figure 3:
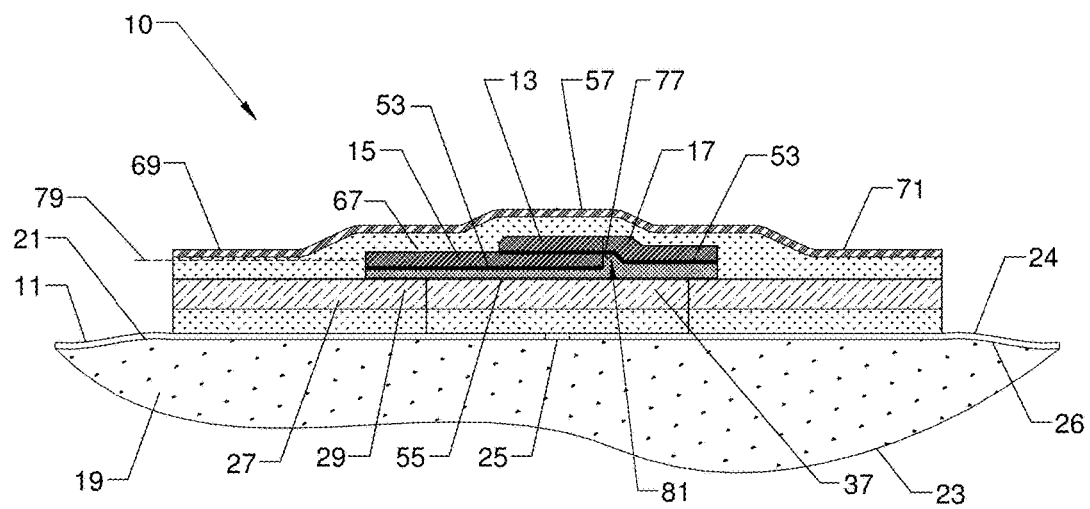
FIG. 3 is a section view taken along section 3-3 of FIG. 2 showing the pressure relief valve in a closed position.
Figure 4:
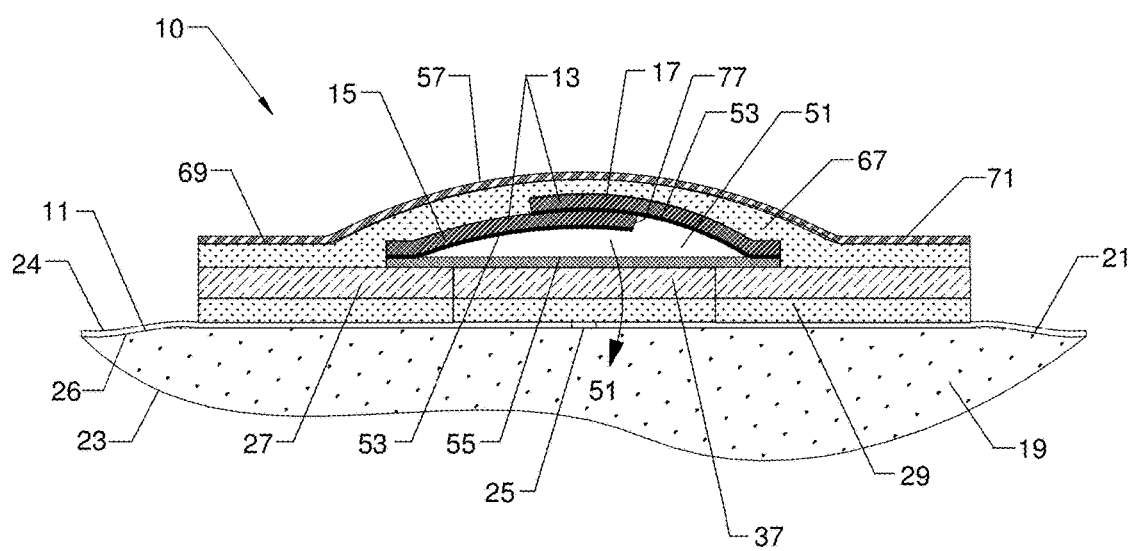
FIG. 4 is a section view taken along section 3-3 of FIG. 2 but showing the pressure relief valve in an open position.

Referring next to FIGS. 3-4, gas to be released from package 11 is within an interior portion 23 of package 11. It should be noted that the gas to be released from package 11 could be from a source other than a gas-producing material within package 11. For example, gas within interior portion 23 of package 11 could be entrapped gas remaining in the package 11 following the packaging process. Gas could be entrapped within a head space of package 11 during packaging of any bulk material (e.g., granular animal food). Such entrapped gas could expand the volumetric size of the package 11 making the package 11 less compact and requiring more space for storage of the package 11 or making it difficult to stack the packages for palletized shipment. In such a setting, a pressure relief valve 10, 110 could be used to allow the package to be compressed to evacuate gas through the valve 10, 110, thereby reducing the volumetric size of the package 11.

Accordingly, pressure relief valve 10, 110 may be used with any type of package wherein it is desired to release gas therefrom and the bag-type package 11 illustrated in FIG. 1 is merely one example of a package 11 which may be used with pressure relief valve 10, 110. Representative examples of other types of packages which may be used with pressure relief valve 10 include flexible and rigid cans, packs, bags, and pouches.

Pressure relief valve 10, 110 is preferably affixed to an exterior surface 24 of package 11 over a vent opening 25 provided entirely through package 11 wall 21. Vent opening 25 may be a hole or holes in wall 21. Pressure relief valve 10, 110 may be affixed to any suitable exterior surface 24 of package 11 having a vent opening 25 including, for example, a top, a bottom, a front, a rear, a side, a lid, a cover, or a cap of package 11. Pressure relief valve 10, 110 may also be used on an interior surface 26 of package 11 in appropriate circumstances.

Valve Component Examples

Referring now to FIGS. 1-9, components of pressure relief valve 10, 110 embodiments will be described.

Base Examples

Referring first to FIGS. 2-7, valve 10, 110 may include a gas-impervious base 27, 127, which may also be thought of as a bottom layer in the examples. Base 27, 127 provides a type of platform on which pressure relief valve 10, 110 may be constructed and may be attached directly to package 11, for example by means of adhesive 29, 129 as described below.

Figure 6:
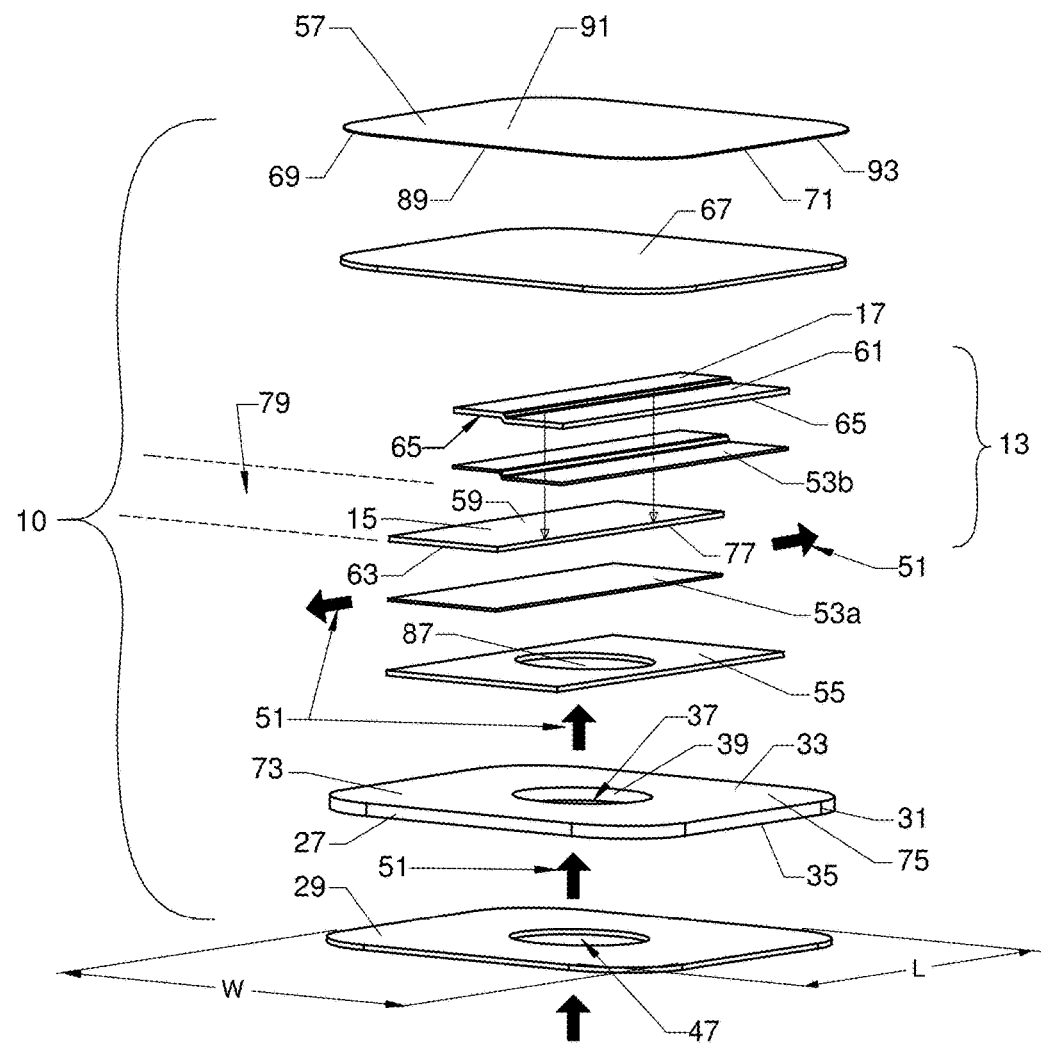
FIG. 6 is an exploded perspective view of the pressure relief valve of FIG. 1.
Figure 7:
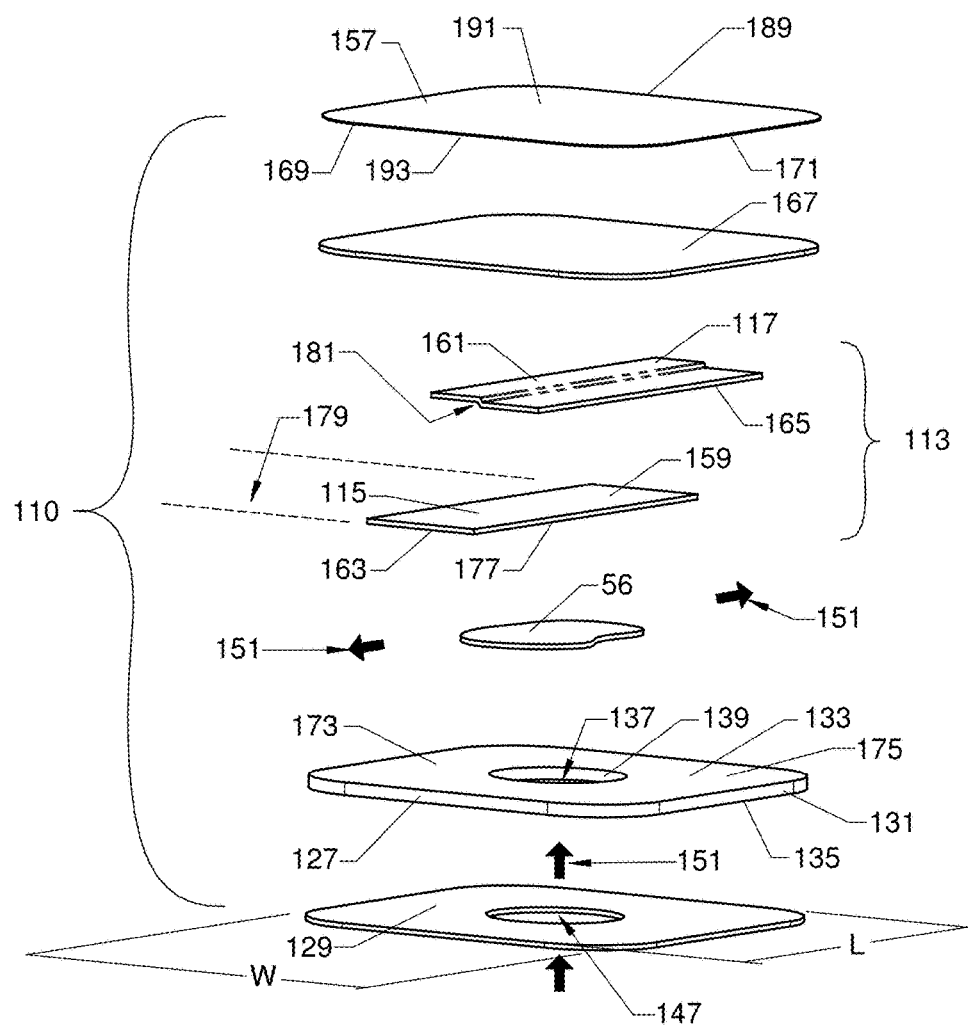
FIG. 7 is an exploded perspective view of a further embodiment of a pressure relief having a plural-part dry strap, but including a wetting fluid.

In the examples, base 27, 127 may include a peripheral edge 31, 131, a first side 33, 133, and a second side 35, 135. Relative to the parts comprising pressure relief valve 10, 110, first side 33, 133 can be considered an inner side, or top side, while second side 35, 135 can be considered an outer, or bottom side. In the example, base 27, 127 is generally flat, or planar, and may be made of a strip-type material. Referring to FIGS. 6-7, base 27, 127 may have a width dimension identified by the character "W" and a length dimension identified by the character "L". Representative materials suitable for use as a base 27, 127 can include polyethylene, polypropylene, and polyester, an example of which is polyethylene terephthalate ("PET"). Other suitable materials may be used for base 27, 127. Base 27, 127 may have a thickness dimension between first and second sides 33 and 35 and 133 and 135 in the range of approximately 0.25 mils to approximately 50 mils for various iterations of valve 10, 110. As used herein, "approximately" means or refers to the value given ±10%.

As illustrated in the examples of FIGS. 1-6 and 7, base 27, 127 may include a vent 37, 137 defined by an inner edge 39, 139. Vent 37, 137 may be generally centrally disposed within peripheral edge 31, 131 of base 27, 127 and may extend entirely through base 27, 127 bounded by inner edge 39, 139, thereby allowing gas to pass through vent 37, 137 and entirely through base 27, 127. Valve 10, 110 would preferably be placed on surface 24 of package 11 with vent 37, 137 in base 27, 127 over and in alignment with vent opening 25 in package 11 and with inner edge 39, 139 surrounding vent opening 25. This arrangement would ensure that ambient air could not enter valve 10, 110 between package 11 and valve 10, 110 and provide a passageway for gas within package 11 to be directed through base 27, 127 and into and through valve 10, 110.

Figure 8A:
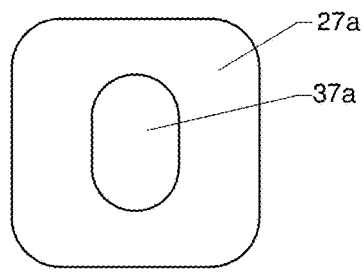
FIGS. 8A-8C are plan views illustrating further embodiments of a base layer and vents.

Vent 37, 137 may comprise any appropriate passage through base 27, 127. For example and as shown in FIGS. 3-4 and 6-7, vent 37, 137 may be a single hole or opening entirely through base 27, 127. As can be seen in FIGS. 1-2, 6-7 and 9, vent 37, 137 may be in the shape of a circle. In FIG. 8A, an oval-shaped vent 37a is provided through base 27a which is otherwise identical to bases 27 and 127. Any suitably-shaped vent 37, such as a polygon, can be utilized.

Figure 8B:
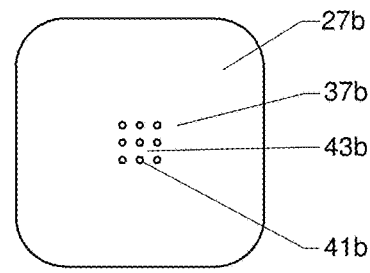
Figure 8C:
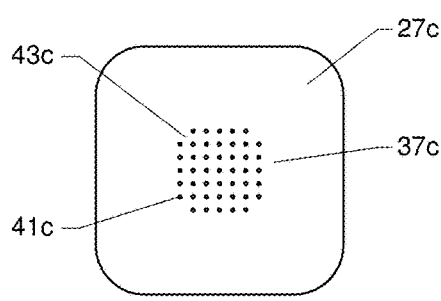

FIGS. 8B and 8C are provided to illustrate further examples of bases and vents which may be used in connection with valves such as valves 10, 110. Bases 27b, 27c may be identical to bases 27, 127 with the exception of vent 37b, 37c. In the examples of FIGS. 8B and 8C, exemplary bases 27b, 27c may be provided with a vent 37b, 37c which also functions as a filter element. A vent 37b, 37c in the form of a filter element can block particulates from entering valve 10, 110, potentially interfering with complete closure and operation of valve 10, 110. Incomplete closure of valve 10, 110 can allow ambient air to enter package 11 through valve 10, 110, potentially oxidizing and damaging coffee 19 or other material contained within package 11.

Referring again to FIGS. 8B-8C, exemplary filter-type vent 37b, 37c defines aperture 41b, 41c and barrier 43b, 43c portions. In the examples, barrier portions 43b, 43c are all parts of base 27b, 27c which are not aperture portions 41b, 41c. Barrier portions 43b, 43c are preferably continuous, gas-impermeable portions of base 27b, 27c which serve as a barrier to movement of any particulate substance through base 27b, 27c.

Aperture portions 41b, 41c preferably consist of plural small openings. To avoid obscuring the drawings, just several of such small openings are indicated by reference number 41b or 41c in FIGS. 8B-8C. Aperture portions 41b, 41c may comprise a plurality of laser drilled or punched holes of a number and size appropriate for the packaging application given requirements for gas flow and particulate filtering. In embodiments, the apertures 41b, 41c may be sized to block particles typical of those found in ground coffee which may be about 300 μm or less in size.

In a further embodiment, a base (e.g., base 27) could include a vent comprising a liquid-impervious membrane (not shown). Such a vent embodiment could be impervious to liquid while allowing passage of gas therethrough. Material used to construct such a vent could include flashspun high-density polyethylene fibers sold under the brand name TYVEK.

Adhesive Examples

Referring now to FIGS. 3-7, adhesive 29, 129 may be provided on base 27, 127 second side 35, 135 to both removably mount base 27, 127 on release liner 45 (FIG. 9) and to permanently attach base 27, 127 and pressure relief valve 10, 110 to a package 11. In the example, adhesive 29, 129 may be approximately 0.25 mils to approximately 15 mils in thickness. Adhesive 29, 129 should surround vent 27, 127 and be impervious to gas flow therethrough to prevent gas leakage between base 27, 127 and exterior surface 24 of package 11.

Referring again to FIGS. 3-7, adhesive 29, 129 may be in the form of a layer applied to base second side 35, 135. Adhesive 29, 129 may be applied to second side 35, 135 of base 27, 127 to define an opening 47, 147 in adhesive 29, 129 which is aligned with and surrounds vent 37, 137 to allow gas to pass through both adhesive 29, 129 and vent 37, 137 of base 27, 127. Suitable adhesives 29, 129 may include pressure-sensitive and heat-activated adhesives. Rubber-based, silicone, and acrylic adhesives may also be utilized.

In base embodiments 27b, 27c of FIGS. 6B-6C, an adhesive (not shown) identical to adhesive 29, 129 may be utilized to secure the base 27b, 27c to a package 11. Such adhesive may be provided on the second side (not shown) of base 27b, 27c surrounding and spaced from all apertures 41b, 41c. Spacing of adhesive from apertures 41b, 41c can avoid obstruction of said apertures 41b, 41c by particulates trapped in the adhesive which may be desirable in certain valve 10, 110 iterations.

In other embodiments, the adhesive (not shown) could be deposited entirely across base 27b, 27c second side (not shown) and apertures 41b, 41c could be formed simultaneously with apertures in adhesive, such as adhesive 29. In such an embodiment, laser drilling or punching of many apertures 41b, 41c in base 27b, 27c would simultaneously form many apertures in the adhesive axially aligned with apertures 41b, 41c. Such an adhesive with apertures aligned with apertures 41b or 41c could serve to trap particulates preventing such particulates from reaching base 27b, 27c which may be desirable in certain other valve 10, 110 iterations.

Plural-Part Dry Strap Examples

In the examples, plural-part strap 13, 113 enables pressure relief valve 10, 110 to be placed in a closed state and, alternatively, in an open state. FIG. 3 is a section view showing an example of the closed state of valve 10, 110 and plural-part dry strap 13, 113 and FIG. 4 is a further section view showing an example of an exaggerated open state of valve 10 and plural-part dry strap. In the closed state, plural-part dry strap 13, 113 is in a first position blocking entry of ambient air into valve 10, 110 and package 11. In the open state, plural-part dry strap 13, 113 is in a further position, or positions, in which valve 10, 110 permits one-way gas flow out from package 11, through pressure relief valve 10, 110 along gas flow path 51, 151 and out to the ambient air and surrounding environment. Plural-part dry strap 13 may, for example, function by undulating movement permitting separate gas bubbles to escape package 11 through valve 10, 110.

Pressure relief valve 10, 110 may be engineered to open and close based on a known, predetermined pressure differential between pressure inside package 11 and pressure outside package 11. The engineered pressure differential may be considered to be a target opening or closing pressure meaning that the pressure differential need not be identical on every opening or closing cycle. Pressure relief valve 10, 110 may be designed to open with any desired pressure differential. By way of example only, pressure relief valve 10, 110 may be designed to have a targeted opening pressure when the pressure inside package 11 exceeds pressure external to package 11 by 0.4 psig or less. Pressure relief valve 10, 110 may be designed to close when the targeted pressure inside package 11 exceeds pressure outside package 11 by 0.008 psig or more. As is known, pounds per square inch gauge (psig) means or refers to the pressure measured relative to ambient pressure. Other opening and closing pressures may be utilized and the foregoing are merely non-limiting examples.

Plural-Part Dry Strap Examples

Examples of a plural-part dry straps 13, 113 will now be described in connection with FIGS. 1-7. In the valve 10 embodiment of FIGS. 1-6, plural-part dry strap 13 is used in conjunction with first and second closure layers 53, 55 and functions without any requirement for use of a wetting fluid 56 (FIG. 7). Valve 10 embodiment avoids potential challenges associated with a wetting fluid 56, such as additional manufacturing steps or potential leaking of the wetting fluid 56 from the valve 10 as previously described.

In the embodiment of FIG. 7, plural-part dry strap 113 is used in conjunction with a wetting fluid 56. However, valve 110 may be relatively more sensitive to pressure changes than existent valves with wetting fluids (e.g., wetting fluid 56).

In the examples, plural-part dry strap 13, 113, comprising first 15, 115 and second 17, 117 dry strap parts overlies vent 37, 137 between base 27, 127 and cover 57, 157. First and second dry strap parts 15, 17 and 115, 117 may each have a first, or top, side 59, 61 and 159, 161 toward cover 57, 157 and a second, or bottom side 63, 65 and 163, 165 toward base 27, 127. First, or top, sides 59, 61 and 159, 161 collectively provide a first or top side of the plural part dry strap 13, 113 and second, or bottom, sides 63, 65 and 163, 165 collectively provide a second or bottom side of the plural part dry strap 13, 113. First and second dry strap parts 15, 17 and 115, 117 may each separately and collectively have a width dimension W less than the width dimension W of base 27, 127, enabling cover 57, 157 to be secured to base 27, 127 on opposite sides of plural part dry strap 13, 113 as described below. First and second dry strap parts 15, 17 and 115, 117 may each have a length dimension L which is the same as the length L dimension of base 27, 127.

In the examples, adhesive layer 67, 167 may join plural-part dry strap 13, 113 to cover 57, 157 and may join cover 57, 157 ends 69, 71 and 169, 171 to corresponding spaced apart attachment regions 73, 75 and 173, 175 of base 27, 127. Because cover 57, 157 is unjoined to base 27, 127 between cover ends 69, 71 and 169, 171 and attachment regions 73, 75 and 173, 175, cover 57, 157 is permitted to flex and to move at least partially away from base 27, 127

(FIG. 4) along this unjoined cover 57, 157 region when valve 10, 110 is in the open state to permit gas flow out of valve 10, 110 and along gas flow path 51, 151. Such flexing may be a slight undulating movement sufficient to accommodate passage of gas bubbles.

Referring to FIGS. 4-7, gas flow path 51, 151 (see arrows in FIGS. 2 and 4-7) extends through vent 37, 137, under plural-part dry strap 13, 113 and is bounded laterally by ends 69, 71 and 169, 171 of cover 57, 157. Gas flow path 51, 151 channels and directs gas outflow through valve 10, 110.

In the examples, first dry strap part 15, 115 has an inner edge 77, 177. Inner edge 77, 177 may overlie vent 37, 137 and may extend across base 27, 127 first side 33, 133 to a position adjacent peripheral edge 31, 131 of base 27, 127 to provide a portion of gas flow path 51 as described herein. Preferably, each opposite end of inner edge 77, 177 extends all the way to meet peripheral edge 31, 131 of base 27, 127.

Also in the examples, second dry strap part 17, 117 partially overlaps or overlies first dry strap part 15, 115 such that a portion of first, or top, side 59 of first dry strap part 15, 115 is in contact with a portion of second, or bottom, side 65 of second dry strap part 17, 117. By way of non-limiting examples, second dry strap part 17, 117 may overlie first dry strap part 17, 117 by a distance of approximately 0.01 inch to approximately 0.25 inch.

Figure 2:
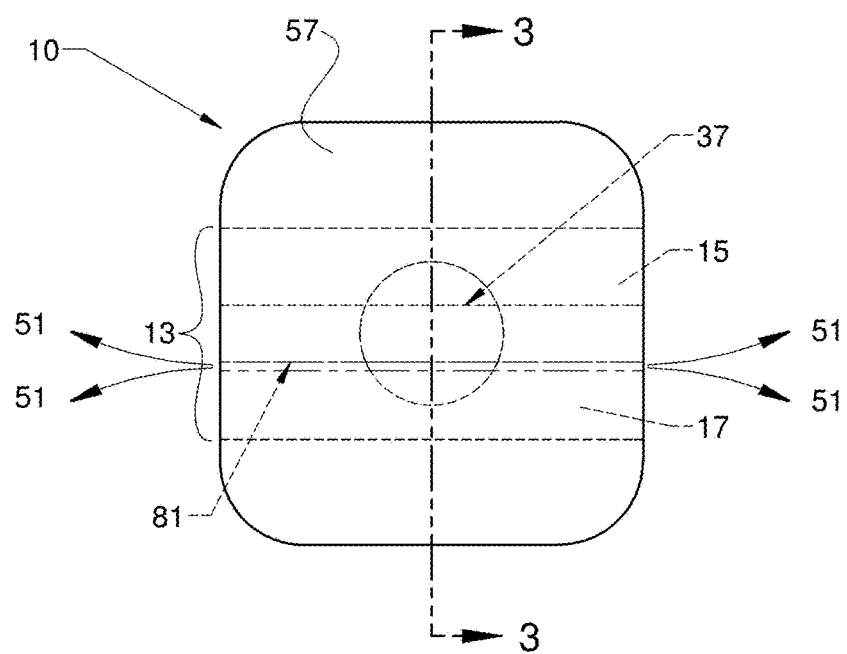
FIG. 2 is a top plan view of the pressure relief valve of FIG. 1 including broken lines to indicate certain internal components.
Figure 5:
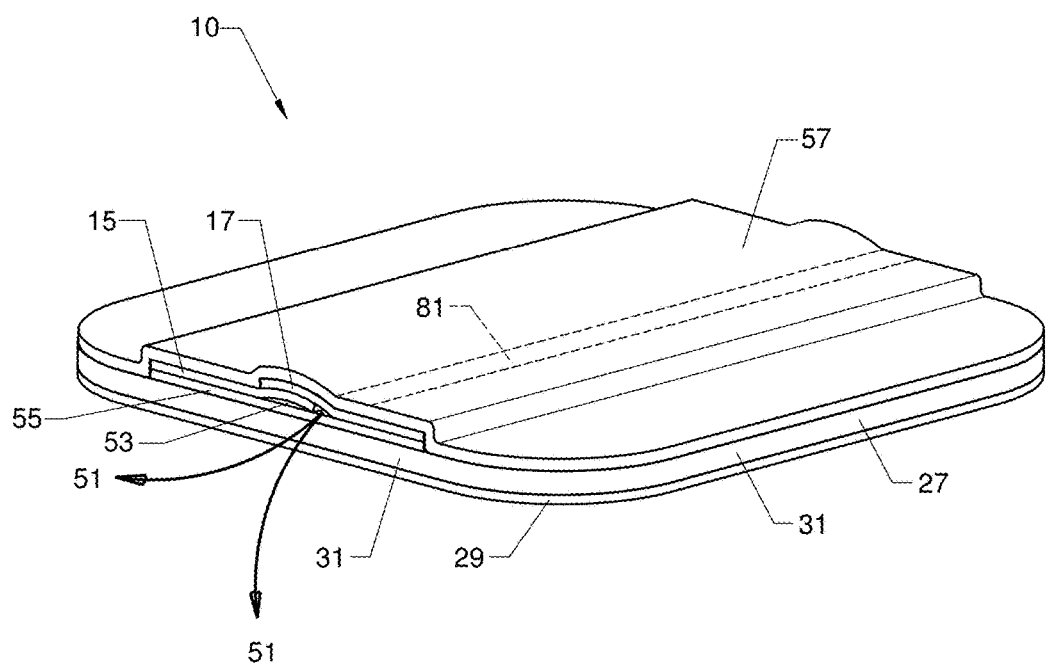
FIG. 5 is a perspective view of the pressure relief valve of FIG. 1 including broken lines to indicate certain internal components.
Figure 9:
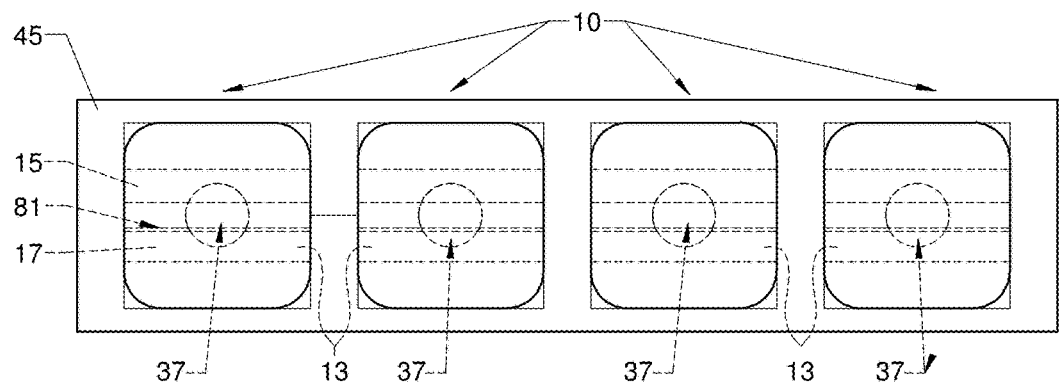
FIG. 9 is a top plan view of four exemplary pressure relief valves of the type illustrated in FIGS. 1-5 arranged on a release liner before attachment to a package.

Referring to FIGS. 3 and 6-7, first dry strap part 15, 115 may be flat and bottom side 63, 163 of first dry strap part 15, 115 may define and lie in a plane 79, 179. The aforementioned overlap of second dry strap part 17, 117 over first dry strap part 15, 115 spaces the second, or bottom, side 65, 165 of second dry strap part 17, 117 from the second, or bottom, side 63, 163 of first dry strap part 15, 115 and away from plane 79, 179 along inner edge 77, 177 of first dry strap part 15, 115. The spacing of second, or bottom, side 65, 165 of second dry strap part 17, 117 above the second, or bottom, side 63, 163 of first dry strap part 15, 115 (and above plane 79, 179) along inner edge 77, 177 of first dry strap part 15, 115 is approximately the same as the thickness dimension of first dry strap part 15, 115. For valve embodiments 10, 110, an elongate gap 81, 181 is defined along inner edge 77, 177 of first dry strap part 15, 115 and bottom 65, 165 of second dry strap part 17, 117 along the region of the overlap of second dry strap part 17, 117 over first dry strap part 15, 115. The broken lines in FIGS. 2, 5 and 9 represent the elongate gap 81 for valve 10, it being understood that gap 181 identical to gap 81 exists for valve 110 shown in the exploded view of FIG. 7.

When plural part dry strap 13, 113 is against base 27, 127, gap 81, 181 provides a region between base 27, 127 and plural-part dry strap 13, 113 along which the force required to separate plural part-dry strap from base 27, 127 is lessened, especially upon the second and subsequent openings of the valve 10, 110, when compared to a conventional valve in which a dry strap rests flush (i.e., not raised in any way) against base 27, 127. Gas from within package 11 is thought to preferentially travel along inner edge 77, 177 of the overlapped first dry strap part 15, 115 and along gap 81, 181 toward peripheral edge 31, 131 of base 27, 127.

Representative materials suitable for use in manufacture of first and second dry strap parts 15, 17 and 115, 117 can include polyethylene, polypropylene, polyester (e.g., PET) or other suitable material. Each of first and second dry strap parts 15, 17 and 115, 117 may have a thickness dimension between first and second sides 59, 63, and 159, 163 and 61, 65 and 161, 165 in the range of approximately 0.25 mils to approximately 5 mils for various iterations of valves 10, 110.

While plural-part dry straps 13, 113 are illustrated with two dry strap parts 15, 17 and 115, 117, it will be understood that three or more dry strap parts (not shown) could be utilized. Such a plural-part dry strap with three or more parts could be identical to plural-part dry straps 13, 113, but with one or more additional dry strap part which could be identical to dry strap part 15, 17 or 115, 117. Each such dry strap part could successively overlap the adjacent dry strap part in the same manner described in connection with the two parts 15, 17 or 115, 117 to provide plural overlapped inner edges like inner edges 77, 177 along which gas may preferentially pass under the plural-part dry strap to a peripheral edge of the valve such as peripheral edge 31, 131. By way of non-limiting examples, the overlaps may be by a distance of approximately 0.01 inch to approximately 0.25 inch.

Such a plural-part dry strap with three or more dry strap parts could be located in the same manner as in valve 10, 110 between a base such as base 27, 127 and a cover such as cover 57, 157 and secured to cover 57, 157 by an adhesive layer such as adhesive layer 67, 167 which could also secure cover 57, 157 ends 69, 71 and 169, 171 to corresponding spaced apart attachment regions of base such as attachment regions 73, 75 and 173, 175 of base 27, 127. As with valves 10, 110, a cover such as cover 57, 157 may be unjoined to base 27, 127 between ends 69, 71 and 169, 171 and attachment regions 73, 75, 173, 175. Such a cover 57, 157 is permitted to flex and to move at least partially away from base 27, 127 as illustrated in the valve embodiment 10 of FIG. 4, along this unjoined cover 57, 157 region when in the open state to permit gas out of the valve and along a gas flow path like paths 51 and 151. Such a gas flow path would enable gas flow through a vent like vent 37, 137, under the plural-part dry strap bounded laterally by ends 69, 71 and 169, 171 of cover 57, 157 as in valves 10, 110. Such a gas flow path channels and directs gas outflow through the valve. As with valves 10, 110, such flexing may be an undulating movement sufficient to accommodate passage of gas bubbles.

Closure Layer Examples

Referring again to FIGS. 1-6 and 9, valve 10 may implement first and second closure layers 53, 55 to provide a re-sealable closure of valve 10. Wetting fluid 56 is not required in this valve 10 embodiment. First and second closure layers 53, 55 may function to close and to open valve 10 by virtue of material properties of such closure layers 53, 55 as described herein.

Referring to FIGS. 3-4 and 6, first closure layer 53 may be positioned on, applied to, or coated on, bottom sides 63, 65 of first and second dry strap parts 15, 17 in a position facing and abutting second closure layer 55. In the examples, first closure layer 53 may comprise two layers, one of which 53a (FIG. 6) is along the second or bottom side 63 of first dry strap part 15 and the other of which 53b (FIG. 6) is along the second or bottom side 65 of second dry strap part 17. A portion of first closure layer 53b may be between first and second dry strap parts 15, 17.

First closure layer 53 may be a gas-impervious silicone, or other dry release film layer. An example of a silicone material which may be implemented as a release film layer is polydimethylsiloxane, a blend of polysiloxanes of a radiation curable (RC) type, and silicone acrylate.

In the examples, second closure layer 55 may be positioned on first side 33, or atop, base 27 and around and surrounding vent 37. Second closure layer 55 may be a gas-impervious layer of an adhesive-like material which may be generally referred to as no tack, ultra low tack, cling film, self wetting, removable adhesive, or a cohesive substrate. In embodiments, second closure layer 55 may also be referred to as a pressure-sensitive low tack adhesive. Representative materials for use as adhesive-like material of second closure layer 55 may include a hot melt styrenic copolymer based formulation material selected from the group consisting of styrene, ethylene, butylene, and a styrene block co-polymer (SEBS). First closure layer 53, which may be of the aforementioned adhesive-like material, may have a non-limiting thickness of approximately 0.25 mils and approximately 15 mils.

Referring to FIG. 6, second closure layer 55 on first side 33 of base 27 may define an opening 87 extending entirely around and surrounding vent 37. Opening 87 may be aligned with opening 47 in adhesive 29 on second side 35 of base 27 and vent 37 to allow gas flow through vent 37 entirely through base 27. Second closure layer 55 may have a length dimension L which is the same as base 27 length L and a width dimension W which is less than the width dimension W of base 27 such that second closure layer 55 is between ends 69, 71 of cover 57.

As illustrated in FIG. 5, second closure layer 55 may extend generally across the length dimension L of base 27 but is generally narrower than the width dimension W of base 27. Plural-part dry strap 13 and second closure layer 55 may be located between attachment regions 73, 75 of base 27.

The release film layer of first closure layer 53 and adhesive-like material layer of second closure layer 55 may have material properties which close valve 10 and yet allow opening and re-closure of valve 10. For example, adhesive-like material layer of second closure layer 55 may have an affinity for release film layer of first closure layer 53. By way of example only, the affinity of adhesive-like material layer of second closure layer 55 toward release film layer of first closure layer 53 can be described in quantitative terms as a bond strength in the range of approximately 0.25 grams/inch to 10 grams/inch when measured with a tensile tester in accordance with ASTM F-88.

With the appropriate selection of materials and inherent surface energies of the adhesive-like material layer and the release film layer, the ability to form seals of controlled bond strength is established. In the examples, the affinity of the adhesive-like material layer of second closure layer 55 for release film layer of first closure layer 53 provides a means for keeping plural-part dry strap 13 in place against base 27 covering vent 37 and achieving a gas-tight seal. The affinity of adhesive-like material layer of second closure layer 55 for release film layer of first closure layer 53 also enables separation of such first and second closure layers 53, 55 sufficient to allow gas to escape valve 10 along gas flow path 51. As previously described, such separation between layers 53, 55 may be of an undulating type with certain portions of first and second closure layers 53, 55 separated by a gas bubble while certain other portions of first and second closure layers 53, 55 are in abutment forming a gas-tight seal. First and second closure layers 53, 55 can seal, open, and reseal to allow passage of gas through valve 10.

Plural-part dry strap 13 with first closure layer 53 of release film layer material thereon covers opening 87 in second closure layer 55 of the adhesive-like material and covers vent 37. Release film layer of first closure layer 53 is in contact with the adhesive-like material layer of second closure layer 55 around vent 37 in base 27 creating a surface attraction between the release film layer of first closure layer 53 and adhesive-like material layer of second closure layer 55 thereby seating plural-part dry strap 13 tightly against base 27 first side 33 blocking gas movement through vent 37 and closing valve 10. Referring to FIG. 3, a portion of second closure layer 55 may fill gap 81 along inner edge 77 of first dry strap part 15 to block ambient air entry along gap 81. Less force is thought to be required to separate first closure layer 53 from second closure layer 55 along inner edge 77 and gap 81 because plural-part dry strap 13 does not lie flat against second closure layer 55 along inner edge 77.

In the examples, first and second closure layers 53, 55 are not joined because such first and second closure layers 53, 55 are separable from one another between cover ends 69, 71 and 169, 171 and attachment regions 73, 75 and 173, 175. First cover layer 53 separates at least partially from second closure layer 55 when differential pressure within package 11 exceeds the target pressure placing valve 10 in the open position illustrated in FIGS. 4 and 5.

The positions of release film layer of first closure layer 53 and adhesive-like material of second closure layer 55 could be exchanged. In such an embodiment, adhesive-like material of second closure layer 55 could be supported on plural-part dry strap 13 and release film layer of first closure layer 53 could be supported on base 27. In other embodiments, first closure layer 53 and second closure layer 55 could each include alternating striations of adhesive-like material and release film layer provided that a barrier to entry of ambient air into valve 10 is provided.

The structure of valve 10 may be modified so that iterations of the valve 10 can open and close at predetermined, known pressures which differ among the iterations. For example, first closure layer 53 of the release film layer and second closure layer 55 of the adhesive-like material layer and may be sized to modify the force required to separate first closure layer 53 from second closure layer 55. In such embodiments, first and second closure layers 53, 55 could have the same length and width dimensions requiring a certain force to at least partially separate first closure layer 53 from second closure layer 55. In other embodiments, release film layer of first closure layer 53 could be provided with a narrower length and/or width dimension providing for relatively less contact between first and second closure layers 53, 55 requiring a lesser force and pressure to separate first closure layer 53 from second closure layer 55 to open valve 10. Such sizing would reduce the surface area of first closure layer 53 (e.g., release film layer) and second closure layer 55 (e.g., adhesive-like material) in contact, thereby reducing the energy required to at least partially separate first closure layer 53 from second closure layer 55 to open valve 10 at a relatively lower target pressure.

By way of further example, the target opening and closing pressures of valve 10 can also be modified by adjusting the area of base 27 and second closure layer 55 thereon. As an example, FIG. 6 shows that vent 37 and opening 87 in second closure layer 55 are circular. However, vent 37 and opening 87 may have a different configuration, such as the oval configuration shown in FIG. 8A. Increasing or decreasing the area of base 27 and area of vent 37 affects the area of first and second closure layers 53, 55 in contact and thus the amount of force required to open and close valve 10 providing an opportunity to modify the pressure required to place pressure relief valve 10 in the open state and/or the closed state.

Wetting Fluid Examples

In the examples of FIG. 7, valve 110 may include a wetting fluid 56 in place of first and second closure layers 53, 55 to provide closing and, alternatively, opening of valve 10. A coating of wetting fluid 56 may be deposited on first side 133 of base 127 under plural-part dry strap 113 and completely around vent 137. Wetting fluid 56 plates out onto at least first side 133 of base 127 and non-overlapped portions of second (i.e., bottom) sides 163, 165 of first and second dry strap parts 115, 117. Wetting fluid 56 wets the aforementioned surfaces to improve sealing closure of the dry strap 113 against base 127. Wetting fluid 56 fills gap 181 along inner edge 177 of first dry strap part 115 to completely block ambient air entry into valve 110 along said gap 181.

Less force is thought to be required to separate second dry strap part 117 from base 127 along inner edge 177 and the gap 181 because plural-part dry strap 113 does not lie flush against base 127 because of the overlap of the second dry strap part 117 over the first dry strap part 115.

Wetting fluid 56 may, for example, be applied to valve 110 during valve 110 manufacture or as the pre-manufactured valve is applied to the package (e.g., package 11). Wetting fluid 56 may be silicone oil, a graphite impregnated oil, a food grade oil or other viscous fluid.

The role of the overlapping dry strap parts 15, 17 and 115, 117 and the gas flow path 51, 151 are described in more detail below.

Cover and Adhesive Examples

In the examples and referring to FIGS. 1-7 and 9, valve 10, 110 cover 57, 157 overlies base 27, 127 and with plural-part dry strap 13, 113 attached to cover 57, 157, for example, by means of adhesive 67, 167. In the examples, cover 57, 157 includes a peripheral edge 89, 189, a first side 91, 191 and a second side 93, 193. Relative to parts comprising pressure relief valve 10, 110, first side 91, 191 can be considered an outer side or top side while second side 93, 193 can be considered an inner or bottom side.

In the examples, cover 57, 157 may be made of a strip-type material. Cover 57, 157 may have a width dimension W and length dimension L which approximate the width and length dimensions of base 27, 127. Cover peripheral edge 89, 189 may be coextensive with base 27, 127 peripheral edge 31 as illustrated in FIGS. 1-7 and 9. Cover 57, 157 may have a thickness dimension between first and second sides 91, 191, 93, 193 in the range of approximately 0.25 mils to approximately 50 mils for various iterations of valve 10, 110. Cover 57, 157 is preferably of a gas-impervious material. Representative materials suitable for use in manufacture of cover 57, 157 can include polyethylene, polypropylene, polyester (e.g., PET) or other suitable material.

As previously described, ends 69, 71 and 169, 171 of cover 57, 157 may be joined to attachment regions 73, 75 and 173, 175 of base 27, 127 by adhesive layer 67, 167 and may be unattached to base 27, 127 therebetween allowing cover 57, 157 to flex slightly away from base 27, 127 so that gas can flow out of valve 10 along gas flow path 51, 151 as previously described. Adhesive 67, 167 may be the same type of adhesive as used for adhesive layer 29, 129. Cover 57, 157 may be joined to base 27, 127 by means other than adhesive layer 67, 167. For example, cover 57, 157 ends 61, 63 and 161, 163 could be joined to respective base 27, 127 attachment regions 73, 75 and 173, 175 by means of ultra sonic welding.

Release Liner Examples

Referring now to FIG. 9, an exemplary series of four pressure relief valves, each indicated as 10 for convenience, are shown mounted on a fragment of a release liner 45. Valves 10 may be removed from release liner 45 and may be attached to a package, such as package 11 of FIG. 1. Release liner 45 may be of a material to which adhesive 29, 129 can temporarily attach valves 10 without damaging adhesive 29, 129. Release liner 45 carries pressure relief valves 10 until the valves 10 are removed during the process of attaching valves 10 to packaging. As illustrated in FIG. 9, valves 10 are conveniently spaced apart at regular intervals along release liner 45, as for example, at a one inch interval between centers, although the repeat spacing is also dependent on the packaging application.

Other Valve Examples

In certain "green" applications in which eco-friendly materials are required, it may be desirable for pressure relief valve 10, 110 to be constructed of biodegradable materials, that is materials which will decompose when in a landfill. Where biodegradability is desired, base 27, 127, plural-part dry strap 13, 113, cover 57, 157 and other valve 10, 110 components may be made of polylactic acid, cellulose acetate, or other compostable materials.

Operation

Referring to FIGS. 1-6, in operation, pressure relief valve 10 is initially in a closed state similar to that shown in FIG. 3. Plural-part dry strap 13 with first closure layer 53 thereon is seated against second closure layer 55 on base 27. In this closed state, second side 63 of first dry strap part 15 and the non-overlapped part of second side 65 of second dry strap part 17 with release film layer of first closure layer 53 thereon are in contact with base 27 first, or top, side 33 and adhesive-like material layer of second closure layer 55. First and second closure layers 53, 55 may be held against the other by a surface affinity between the materials comprising release film layer and adhesive-like material layers 53, 55 to provide a gas-impervious air-tight seal. In such examples, no wetting fluid is required to form a complete gas-impervious air-tight seal between plural-part dry strap 13 and base 27 because the surface affinity is sufficient to keep pressure relief valve 10 in a closed state. Further, force applied by cover 57 serves to hold plural-part dry strap 13 sealingly against base 27. Therefore, in the closed state shown in FIG. 3, plural-part dry strap 13 blocks movement of gas through vent 37, preventing gas inside package 11 from escaping to the atmosphere and preventing ambient air from entering package 11, thus preserving the freshness of the coffee 19 or other material inside package 11.

Referring to FIG. 7 and the valve 110 embodiment illustrated therein, pressure relief valve 110 is also initially in a closed state similar to that shown in FIG. 3. Plural-part dry strap 113 abuts base 127 first, or top, side 133 with wetting fluid 56 surrounding vent 137 and filling elongate gap 181 along inner edge 177 of first dry strap part 115 overlapped by bottom 165 of second dry strap part 117. Wetting fluid 56 provides surface adhesion between plural-part dry strap 113 and base 127 and cover 157 provides a force which collectively serve to hold plural-part dry strap 113 sealingly against base 127 blocking movement of gas through vent 37 preventing gas inside package 11 from escaping to the atmosphere and preventing ambient air from entering package 11 preserving the freshness of the coffee 19 or other material inside package 11.

In the embodiments of pressure-relief valves 10, 110, when pressure inside package 11 builds to exceed the predetermined and known target pressure each valve 10, 110 will at least partially open to allow gas to escape from package and through valve 10, 110. In the embodiment of valve 10, force applied through vent 37 and against plural-part dry strap 13 causes at least partial separation of first closure layer 53 from second closure layer 55 and causes cover 57 to at least partially flex outward away from base 27 to the open state, such as illustrated in FIGS. 4-5.

In the embodiment of valve 110, force applied through vent 137 and against plural-part dry strap 113 causes at least partial separation of plural-part dry strap 113 from base 127 so that valve 110 is in the open state. The flexure of cover 57, 157 may allow complete, partial or undulating separation of plural-part dry strap 13, 113 from base 27, 127 to open gas flow path 51, 151 allowing gas to escape from package 11 when valve 10, 110 is in the open state.

Without wishing to be bound by any particular theory, in the embodiment of valve 10 the overlap of first and second dry strap parts 15, 17 is thought to modify the securement of the release film layer of first closure layer 53 and the adhesive-like material of second closure layer 55 along inner edge 77 of first dry strap part 15 and under second dry strap part 17. In the embodiment of valve 110, the overlap of first and second dry strap parts 115, 117 is thought to modify the sealing surface attraction provided by wetting fluid 56. In both valve embodiments 10, 110, the overlap is thought to provide an irregular bottom surface 63, 65, 163, 165 of plural-part dry strap 13, 113 against base 27, 127 which lessens the force required to open the valve 10, 110 as compared with a valve having a single-part dry strap which would lie flush or flat against base (e.g., base 27, 127). Lateral shear force is required to separate plural part dry strap 13, 113 from base 27, 127. Even though gap 81, 181 is filled with a first or second closure layer 53, 55 or wetting fluid 56, it is believed that less shear force is required to separate plural part dry strap 13, 113 from base 27, 127 because second dry strap part 17, 117 is pre-separated from base 27, 127 because of the overlap. Gas from within package 11 is thought to preferentially pass along inner edge 77, 177 of first dry strap part 15, 115.

The overlap of second dry strap part 17, 117 over first dry strap part 15, 115 is also thought to further lessen the force required to open valve 10, 110 on second and subsequent openings which occur shortly after a first opening as compared with a valve that includes a single-part dry strap which would lie flush or flat against a base (e.g., base 27, 127).

As previously described, the flexure of cover 57, 157 and plural-part dry strap 13, 113 may be of an undulating-type or burping-type, permitting single bubbles of gas to escape from package 11 through valve 10, 110. Such undulating movement would result from portions of plural-part dry strap 13, 113 remaining in sealing contact with base 27, 127 while there is separation between plural-part dry strap 13, 113 and base 27, 127 to accommodate a bubble of gas therebetween.

When the differential pressure is decreased below a predetermined and known target pressure, cover 57, 157 applies a force as it returns to its original position. In the embodiment of valve 10, the force causes plural-part dry strap 13 to be re-seated on base 27 with release film layer of first closure layer 53 in sealing contact with adhesive-like material of second closure layer 55 closing vent 37 and returning pressure relief valve 10 to the closed state. In the embodiment of valve 110, the force causes plural-part dry strap 113 to be re-seated on base 127 with wetting fluid 56 plated out therebetween closing vent 137 and returning pressure relief valve 110 to the closed state.

The process of opening and closing pressure relief valve 10, 110 is repeated when differential pressure inside package 11 again exceeds the target opening pressure and can continue until all of the coffee 19 is removed from package 11. The force and pressure required for the second and subsequent valve openings may be lessened because of the structure of the plural-part dry strap 13, 113 as described previously.

Iterations of pressure relief valve 10 (or valve 110) may include a vent in the nature of a particulate filter comprising aperture 41b, 41c and barrier portions 43b, 43c. If provided, the filter advantageously blocks small particulate matter within package 11 from entering pressure relief valve 10 and becoming lodged between base 27, 127 and plural-part dry strap 13, 113. Any such lodgment of particulate matter could create unwanted passageways between plural-part dry strap 13, 113 and base 27, 127 interfering with complete closure of valve 10, 110 which could allow ambient air to enter package 11 through pressure relief valve 10, 110.

Examples

A pressure-relief valve 10 according to the invention and two comparative pressure-relief valves were evaluated with respect to their target opening and closing pressures. Example 1 designated "Comparative Valve 1" was a wetted valve with a silicone oil wetting fluid identical to valve 110 of FIG. 7 but having a single-part dry strap in place of the plural-part dry strap 113. Example 2 designated "Comparative Valve 2" was identical to that of FIGS. 1-6 but having a single-part dry strap in place of the plural-part dry strap 13. Comparative Valve 2 included a first closure layer on the single-part dry strap identical to the release film layer of first closure layer 53. Example 3 was a valve according to the invention identical to the valve 10 of FIGS. 1-6 and 9 and designated "Experimental Valve".

Comparative Valves 1 and 2 and the Experimental Valve were tested for target opening and closing pressures using a Plitek Model VT-200 pressure testing device. The VT-200 replicates pressure from within a package and determines the minimum pressure required to open the valve and the maximum pressure at which the valve will close.

Ten trials were conducted for each of Comparative Valves 1-2 and the Experimental Valve. Observations were made of initial opening and closing pressures (designated "$1^{st}$ Open" and "$1^{st}$ Close"), the pressure at which the valves remained closed for 60 seconds (designated "hold" for holding pressure) and the second opening and closing pressures (designated "2d Open" and "2d Close"). Average pressures in pounds per square inch gauge are provided in Table 1.

TABLE 1

Comparison of Valve Opening and Closing Pressures and Closed Holding Pressure
(Average values for 10 trials in units psig)

| Example | Valve | $1^{st}$ Open | $1^{st}$ Close | Hold | 2d Open | 2d Close |
|---|---|---|---|---|---|---|
| 1 | Comparative Valve 1 | 0.235 | 0.064 | 0.064 | 0.182 | 0.058 |
| 2 | Comparative Valve 2 | 0.282 | 0.031 | 0.032 | 0.303 | 0.035 |
| 3 | Experimental Valve | 0.248 | 0.035 | 0.035 | 0.220 | 0.034 |

Examples 1-3 demonstrate that an Experimental Valve according to the invention has approximately the same target first and second opening pressures as does the pressure-relief valve of Comparative Valve 1 for which a wetting fluid is required. The Experimental Valve achieves this result without any requirement for a wetting fluid. Avoidance of a wetting fluid may be highly desirable in certain applications where the cost associated with a wetting fluid or where the potential leakage of wetting fluid from the valve is not wanted. Comparative Valve 2, which lacks a plural-part dry strap 13, requires relatively more force and pressure for the first and second openings than does Comparative Valve 1 indicating that the plural-part dry strap 13 of the Experimental Valve example modulates the force and pressure required to operate the Experimental Valve.

The data further show that the Experimental Valve according to the invention has a lower target opening pressure than does Comparative Valve 2. And, the Experimental Valve has a target pressure for second and subsequent openings less than that of Comparative Valve 2.

The data show that the Experimental Valve provides performance improvements relative to Comparative Valves 1 and 2. The performance benefits can be attributed to the unique mechanical structure of the plural-part dry strap 13.

The foregoing description is provided for the purpose of explanation and is not to be construed as limiting the invention. While the invention has been described with reference to preferred embodiments or preferred methods, it is to be understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. The disclosed one-way pressure relief valves may address some or all of the problems previously described.

A particular embodiment need not address all of the problems described, and the claimed pressure relief valves should not be limited to embodiments comprising solutions to all of these problems. Further, several advantages have been described that flow from the structure and methods; the present invention is not limited to structure and methods that encompass any or all of these advantages. Those skilled in the relevant art, having the benefit of the teachings of this specification, may effect numerous modifications to the invention as described herein, and changes can be made without departing from the scope and spirit of the invention as defined by the appended claims. Furthermore, any features of one described embodiment can be applicable to the other embodiments described herein.

What is claimed is:

1. A pressure relief valve comprising:
   a base having a top, a bottom, a width, a peripheral edge, and a vent extending entirely through the base;
   a cover overlying the base, the cover having a peripheral edge and opposite ends secured with respect to the top of the base, the opposite ends defining a cover width therebetween;
   a plural-part dry strap having a total width less than the width of the base and the width of the cover and overlying the entire vent between the base and the cover, the plural-part dry strap having overlapping dry strap parts with an overlapped edge of one of the dry strap parts both overlying the vent and extending between the cover and base to a position adjacent at least one of the peripheral edges of the base and the cover from which gas can escape the pressure relief valve; and
   a wetting fluid disposed between the plural-part dry strap and the base entirely around the vent.

2. The pressure relief valve of claim 1 wherein the plural-part dry strap includes:
   a first dry strap part having a top, a bottom, and the overlapped edge; and
   a second dry strap part having a top and a bottom with a portion of the bottom of the second dry strap part overlapping the overlapped edge and the top of the first dry strap part and a further portion of the bottom of the second dry strap part which is non-overlapping of the first dry strap part.

3. The pressure relief valve of claim 2 wherein:
   the first and second dry strap parts each have a thickness dimension;
   the bottom of the first dry strap part defines a plane; and
   the non-overlapping bottom of the second dry strap part along the overlapped edge is spaced from the plane by at least the thickness dimension.

4. The pressure relief valve of claim 3 wherein:
   a first pressure is required to allow gas flow between the base and the non-overlapping bottom of the second dry strap part along the overlapped edge;
   a second pressure is required to allow gas flow between the base and the bottom of the first dry strap part; and
   the first pressure is less than the second pressure.

5. The pressure relief valve of claim 3 wherein the peripheral edge of the cover is adjacent the peripheral edge of the base.

6. The pressure relief valve of claim 5 wherein the overlapped edge of the plural-part dry strap extends to and meets the adjacent peripheral edges of the base and the cover.

7. The pressure relief valve of claim 6 further including an adhesive securing the cover to the top of the first dry strap part and the top of the second dry strap part and securing the opposites ends of the cover to the base on opposite sides of the plural-part dry strap.

8. The pressure relief valve of claim 7 wherein the base, the plural-part dry strap, and the cover are each of a strip material.

9. The pressure relief valve of claim 8 wherein the base, the plural-part dry strap, and the cover are of a material or materials selected from the group consisting of polyethylene, polypropylene, and polyester.

10. The pressure relief valve of claim 8 further comprising an adhesive on the bottom of the base for securing the pressure relief valve to a surface.

11. A pressure relief valve comprising:
    a base having a top, a bottom, a width, a peripheral edge, and a vent extending entirely through the base;
    a cover overlying the base, the cover having a peripheral edge and opposite ends secured with respect to the top of the base, the opposite ends defining a cover width therebetween;
    a plural-part dry strap having a bottom and a total width less than the width of the base and the width of the cover and overlying the entire vent between the base and the cover, the plural-part dry strap having overlapping dry strap parts with an overlapped edge of one of the dry strap parts both overlying the vent and extending between the cover and base to a position adjacent at least one of the peripheral edges of the base and the cover from which gas can escape the pressure relief valve;
    a first closure layer on the bottom of the plural-part dry strap;

a second closure layer on the top of the base entirely around the vent, the first and second closure layers forming a re-sealable seal entirely around and closing the vent and being at least partially separable by an increase in gas pressure.

12. The pressure relief valve of claim 11 wherein the plural-part dry strap includes:
a first dry strap part having a top, a bottom, and the overlapped edge; and
a second dry strap part having a top and a bottom with a portion of the bottom of the second dry strap part overlapping the overlapped edge and the top of the first dry strap part and a further portion of the bottom of the second dry strap part which is non-overlapping of the first dry strap part.

13. The pressure relief valve of claim 12 wherein:
the first and second dry strap parts each have a thickness dimension;
the bottom of the first dry strap part defines a plane; and
the non-overlapping bottom of the second dry strap part along the overlapped edge is spaced from the plane by at least the thickness dimension.

14. The pressure relief valve of claim 13 wherein:
a first pressure is required to allow gas flow between the base and the non-overlapping bottom of the second dry strap part along the overlapped edge;
a second pressure is required to allow gas flow between the base and the bottom of the first dry strap part; and
the first pressure is less than the second pressure.

15. The pressure relief valve of claim 13 wherein one of the first and second closure layers comprises a release layer and the other of the first and second closure layers comprises an adhesive-like material layer.

16. The pressure relief valve of claim 15 wherein the release layer and the adhesive-like material layer are separably held together by an attraction.

17. The pressure relief valve of claim 15 wherein the first closure layer is of a hot melt styrenic copolymer based formulation material selected from the group consisting of styrene, ethylene, butylene, and styrene block co-polymer.

18. The pressure relief valve of claim 17 wherein the second closure layer is of a material selected from the group consisting of polydimethylsiloxane, a blend of radiation curable (RC) polysiloxanes, and silicone acrylate.

19. The pressure relief valve of claim 18 further including an adhesive securing the cover to the top of the first dry strap part and the top of the second dry strap part and securing the opposite ends of the cover to the base on opposite sides of the plural-part dry strap.

20. The pressure relief valve of claim 19 wherein the base, the plural-part dry strap, and the cover are each of a strip material.

21. The pressure relief valve of claim 20 wherein the vent includes a plurality of aperture and barrier portions defining a filter element.

22. The pressure relief valve of claim 20 wherein the base, the plural-part dry strap, and the cover are of a material or materials selected from the group consisting of polyethylene, polypropylene, and polyester.

23. The pressure relief valve of claim 22 further comprising an adhesive on the bottom side of the base for securing the pressure relief valve to a surface.

* * * * *